United States Patent [19]

Kaman, II

[11] 4,353,862

[45] Oct. 12, 1982

[54] METHOD FOR MAKING SOUND BOARD

[75] Inventor: Charles W. Kaman, II, Marlborough, Conn.

[73] Assignee: Kaman Aerospace Corporation, Bloomfield, Conn.

[21] Appl. No.: 149,243

[22] Filed: May 12, 1980

[51] Int. Cl.³ .................... B29C 11/00; B29C 27/10; B29D 3/02; B29G 7/00

[52] U.S. Cl. ................................. 264/571; 156/245; 156/286; 264/102; 264/135; 264/138; 264/257

[58] Field of Search .............. 264/258, 101, 102, 257, 264/275, 138, 571, 135; 156/245, 286

[56] References Cited

U.S. PATENT DOCUMENTS

| | | | |
|---|---|---|---|
| 2,013,865 | 9/1935 | Sloan | 264/258 |
| 2,428,325 | 9/1947 | Collins | 428/105 |
| 3,041,217 | 6/1962 | Fennebresque et al. | 264/258 |
| 3,699,836 | 10/1972 | Glasser | 264/275 |
| 3,880,040 | 4/1975 | Kaman | 84/291 |
| 3,886,248 | 5/1975 | Nicholson | 264/102 |
| 4,132,755 | 1/1979 | Johnson | 264/102 |

FOREIGN PATENT DOCUMENTS 197809  3/1977  Fed. Rep. of Germany ...... 156/286

*Primary Examiner*—Willard E. Hoag
*Attorney, Agent, or Firm*—McCormick, Paulding & Huber

[57] ABSTRACT

A fiber glass fabric reinforced wood sound board for a guitar is made by placing a sheet of wood in a shallow mold cavity with a layer of fiber glass fabric overlying an associated surface of the wood sheet, spreading a layer of liquid resinous compound over the layer of fabric to impregnate the fabric, providing a plate having a smooth surface, positioning the plate with its smooth surface in face-to-face engagement with the layer of liquid impregnating material to provide a substantial closure for the mold cavity, drawing vacuum on the mold cavity, and curing the liquid resinous material.

5 Claims, 10 Drawing Figures

METHOD FOR MAKING SOUND BOARD

BACKGROUND OF THE INVENTION

This invention relates in general to musical instruments and deals more particularly with an improved method for making a sound board for a stringed musical instrument such as a guitar. The sound board for a high quality guitar is usually made from a relatively thin sheet of wood, as, for example, a sheet of solid spruce or fir. Such a sound board may, for example, be of graduated thickness, tapering from 0.140 inches near the neck end of the guitar to 0.110 inches at the end opposite the neck or may be of uniform thickness as, for example, 0.100 inches thick. It is customary to finish at least the outer surface of the sound board with a clear or transparent finishing material so that the natural grain of the wood is visible in the finished instrument. A high quality polyester resin, lacquer or urethane finishing material is frequently used for this purpose. While such sound boards generally provide desirable sound amplification, problems have been encountered with checking or cracking of the finish and in some instances cracking of the sound board when an instrument is subjected to extremes of temperature and humidity. This problem is particularly prevalent when availability of wood dictates that a lower grade of wood must be used. The present invention is particularly directed to this problem. However, it is a further aim of the invention to provide improved method for making a sound board for a quality instrument and which may be produced at lower cost than present sound boards of like quality.

SUMMARY OF THE INVENTION

In accordance with the present invention a sound board for a stringed musical instrument is made by applying a layer of woven fabric in face-to-face relation with a sheet of sound board material, spreading a layer of liquid impregnating material over the layer of fabric, providing a plate having a smooth surface, positioning the plate with its smooth surface in light pressing engagement with the surface of the liquid impregnating material, subjecting the assembly comprising the sheet of sound board material, the layer of fabric, and the layer of liquid impregnating material to vacuum, curing the impregnating material, and removing the plate from engagement with the cured impregnating material.

DETAILED DESCRIPTION OF PREFERRED METHODS

Figure 1:
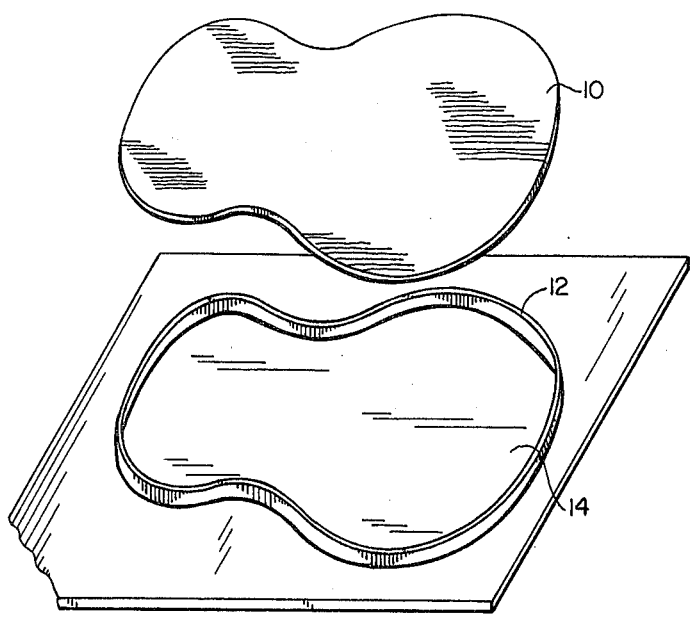
FIGS. 1-5 are somewhat schematic perspective views and illustrate successive steps in making a sound board in accordance with the present invention.
Figure 2:
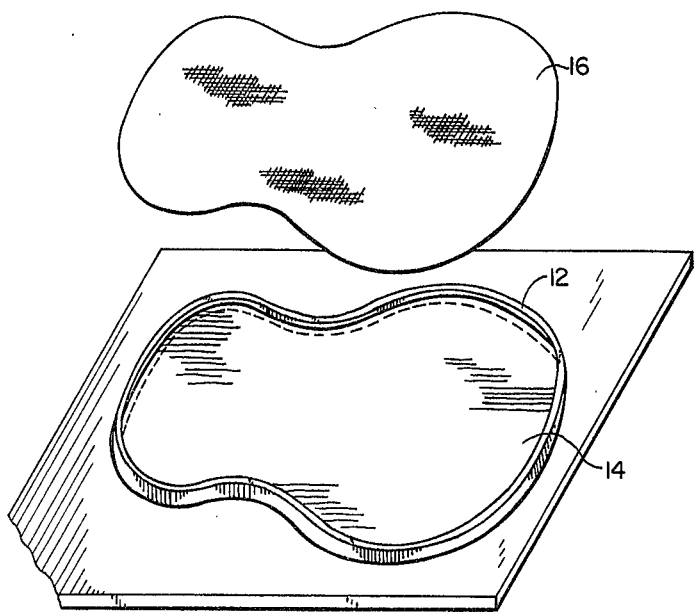

Turning now to the drawings, successive steps in a method for making a sound board for a guitar are illustrated somewhat schematically in FIGS. 1-5. Referring first to FIG. 1, a solid sheet of sound board material or wood finished to desired thickness and formed to the shape of a sound board for a guitar is indicated by the numeral 10. The sound board material 10 is placed within the shallow cavity of an upwardly opening female mold 12, which has a substantially flat upwardly facing bottom surface 14 to provide support for the under surface of the sound board material. A layer of woven fabric 16, shaped to complement the sound board 10, is then placed within the mold 12 in overlying face-to-face relation with the upper surface of the sound board material and in registry with it. The fabric layer preferably comprises finely woven fiber glass material shaped to complement the sound board material 10, so that its warp threads extend longitudinally of the sound board material, in generally parallel alignment with the grain of the wood, and its woof threads extend transversely of the sound board material, that is generally normal to the direction of wood grain, as shown in FIG. 2.

Figure 3:
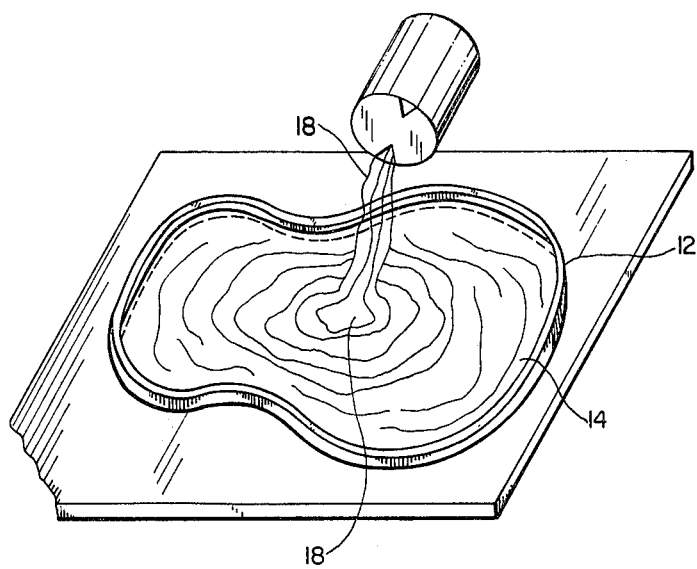
Figure 4:
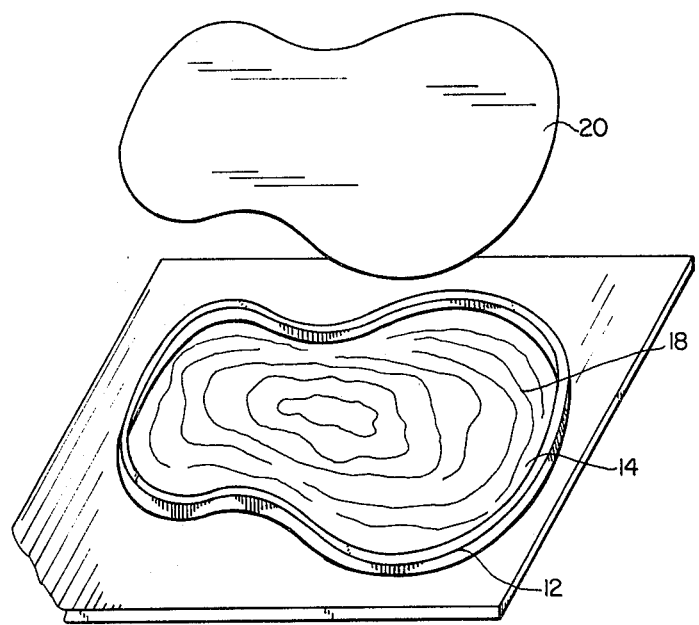
Figure 5:
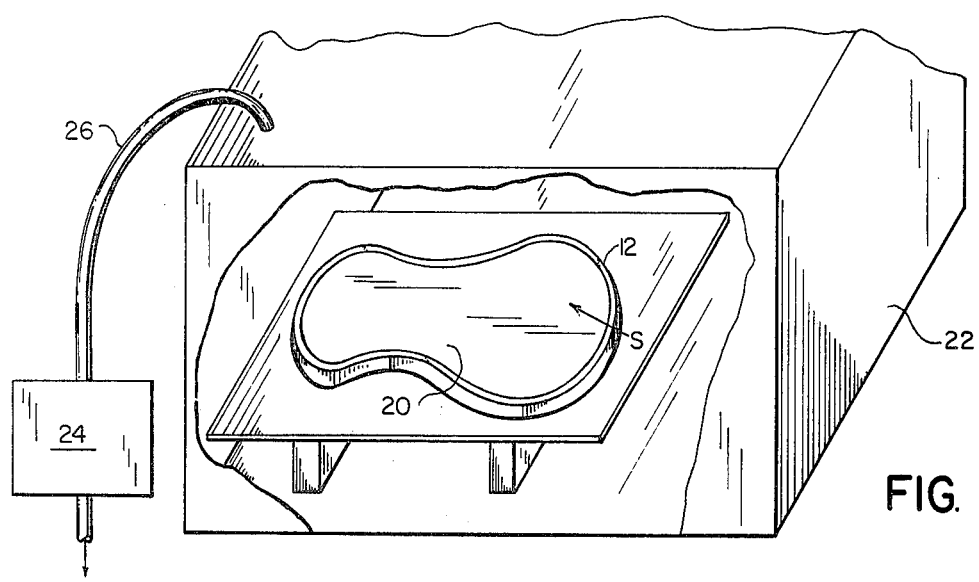

A layer of liquid impregnating material 18, preferably comprises a transparent polyester resin finishing material, and is next spread over the exposed upper surface of the fabric layer 16. A sufficient quantity of material 18 is introduced into the mold 12 to impregnate the fabric layer 16 and substantially cover it, as shown in FIG. 3. Thereafter, a plate 20 which has a substantially smooth lower surface is positioned in the mold 12 with its smooth lower surface in light pressing engagement with the layer of impregnating material 18. The plate 20 provides a substantial closure for the mold 12.

If desired, the aforesaid steps in the process may also be performed in a generally reverse order. In this instance, the impregnating material is first poured into the mold. The layer of fabric is then placed in the mold followed by the sheet of sound board material. The plate 20 may be used both as a closure for the mold 12 and as a weight to bring the impregnated surface of the fabric layer and the smooth flat bottom surface of the mold cavity into light pressing engagement.

The entire structure which comprises the mold 12, its cover plate 20, and the sound board assembly, designated generally by the letter S, which includes the sound board material 10, the layer of fabric 16, and the layer of liquid impregnating material 18, is placed within a vacuum chamber 22 and subjected to vacuum drawn on the chamber by an associated vacuum pump 24 which is connected in communication with the interior of the chamber by a conduit 26. The impregnating material 18 is then cured. Preferably, vacuum is applied to the chamber 22 during the entire curing process.

After the impregnating or finishing material 18 has cured, the mold structure and sound board assembly S are removed from the vacuum chamber. The plate 20 may then be removed from engagement with the cured layer of impregnating material 18. Thereafter, the finished sound board assembly S is removed from the mold cavity.

Application of vacuum to the sound board assembly S during the curing process assures removal of all air bubbles from the impregnating material 18 which forms the finish surface of the sound board. Application of the smooth metal plate to the layer of liquid impregnating material 18 during its drying or curing process assures a smooth finish surface so that no further finishing is required. The finished sound board assembly S will, of course, be provided with a sound hole (not shown), which may be formed in the sound board assembly after it has been removed from the mold. However, if desired, a sound hole or holes may be formed in the sound board material and in the fiber glass fabric before assembly so that a finished sound board assembly may be produced by the aforesaid method which is ready for assembly in a guitar. If the sound hole is formed in the sound board material and in the fabric before assembly, a suitable core may be provided in the mold cavity to fill the aforesaid holes so that liquid impregnating material 18 will not accumulate within the holes when it is spread over the fabric layer 16.

Figure 6:
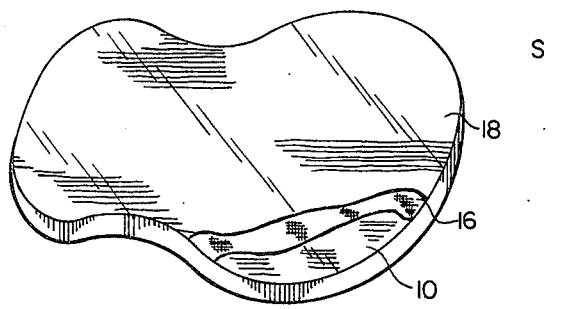
FIG. 6 is a perspective view of a sound board made in accordance with the method illustrated in FIGS. 1-5.
Figure 7:
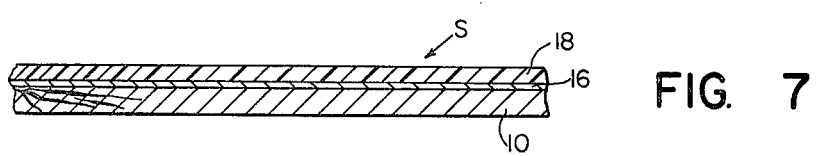
FIG. 7 is a somewhat enlarged fragmentary sectional view taken along the line 7—7 of FIG. 6.

A typical sound board assembly S made in accordance with a method of the invention is shown in FIGS. 6 and 7. The sound board assembly S comprises a wood sound board 10, a layer of fabric 16, and a layer of finishing material 18. The fine threads which comprise the fabric layer 16 are scarcely perceptable through the transparent finish layer 18. However, these threads respectively reinforce the sound board material 10, particularly in a direction transverse of the wood grain and make the sound board assembly S highly resistive to cracking. The threads of the fabric 16 also impart integrity to the finish layer 18 and render the finish highly resistive to cracking or checking, even at temperatures substantially lower than 10 degrees Fahrenheit, the temperatures at which a conventional polyester resin, lacquer or urethane finish on wood may normally be expected to check or crack.

Figure 8:
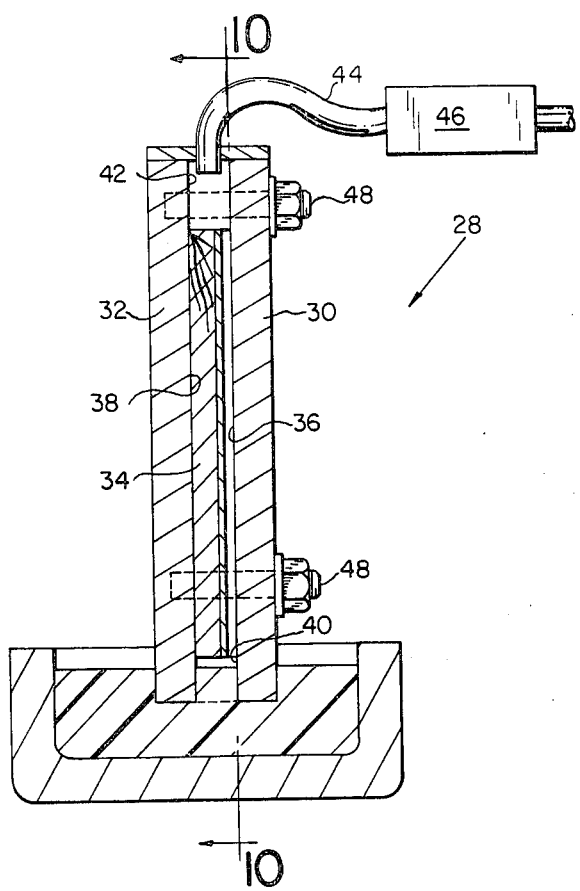
FIGS. 8 and 9 are vertical sectional views through a molding apparatus and illustrate another method for making a sound board in accordance with the invention.
Figure 10:
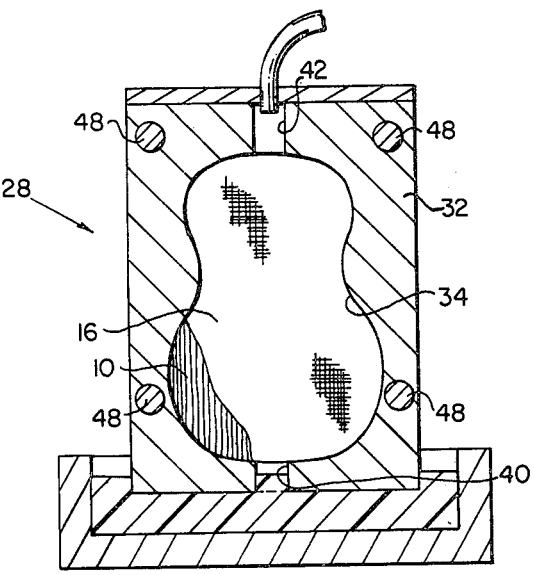
FIG. 10 is a somewhat reduced sectional view taken along the line 10—10 of FIG. 8.
Figure 9:
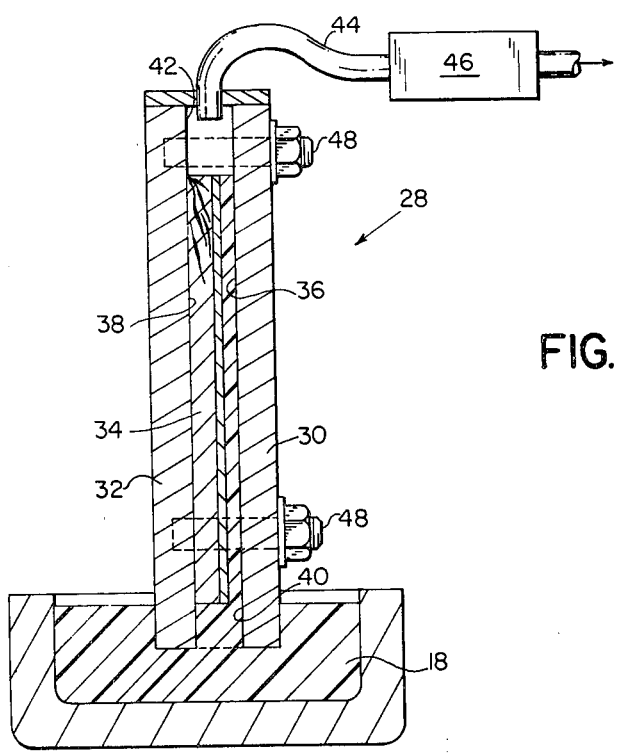

In FIGS. 8-10 another method for making a sound board is illustrated somewhat schematically. The illustrated method utilizes a mold assembly, indicated generally at 28, formed by front and rear mold plates 30 and 32 which cooperate in assembly to define a mold cavity 34. The shape of the cavity 34 may vary and may, for example, be rectangular, but preferably, and as shown, the cavity is shaped to conform to the shape of a guitar top or sound board. The front and rear plates respectively define inner surfaces 36 and 38. The inner surface 36 is preferably polished to a smooth finish. The illustrated mold assembly 28 has openings 40 and 42 at its opposite ends which communicate with the mold cavity 34, as best shown in FIG. 10. A conduit 44 connected to a vacuum pump 46 is connected to the mold in communication with the opening 42, substantially as shown.

In making a sound board S in accordance with the illustrated method, a sheet of woven fiber glass 16 or like material is placed in overlying face-to-face complementary relation with an associated sheet of sound board material 10, such as fir or spruce. As shown, the sound board material 10 and the fabric 16 are precut to the shape of a sound board for a guitar. The fabric layer 16 is preferably taped or otherwise temporarily secured to the sound board material 10, for a reason which will be hereinafter further evident.

The sound board material 10 and its overlying layer of fabric 16 is next placed in the mold cavity 34. The rear surface of sound board material is preferably temporarily secured to the inner surface 38 and may be so secured by double sided strips of adhesive, for example. The mold assembly 28 is then closed and secured in closed position. In the illustrated embodiment bolts 48, 48 are shown for securing the mold assembly in closed position, however, any suitable mold clamping arrangement may be used. Liquid resinous impregnating or finishing material 18 is supplied to the mold cavity 34 through the opening 40. In accordance with the illustrated method, the mold assembly 28 is supported in a substantially vertical or upright position with its lower end disposed within a pan 50 which contains liquid resinous material 18 so that the opening 40 is in communication with the material 18.

The mold cavity is dimensioned so that the space between the exposed surface of the layer of fabric 16 and the smooth inner surface 36 is substantially equal to the desired thickness of the layer of impregnating or finishing material 18. It is for this reason that the rear surface of the sound board material 10 is temporarily adhered to the inner surface 38 and the fabric layer 16 is taped or otherwise temporarily attached in face-to-face relation with the sound board material 10. Vacuum is drawn on the mold cavity 34 by operating the vacuum pump 46 thereby causing liquid resinous impregnating material 18 to be drawn from the pan 50 into the mold cavity through the opening 40. Suitable means (not shown) is provided for preventing liquid impregnating material 18 from being drawn from the mold cavity 34 and into the conduit 44. The liquid impregnating material 18 is drawn into and substantially fills the space between the inner surface 36 and the associated surface of the fabric layer 16. The impregnating material 18 also fills the pores of the fabric 16 and any voids in the associated surface of the sound board material 10, such as slight depressions in the wood grain. The applied vacuum effectively removes air which may be entrapped within the liquid finishing material 18. Preferably, the mold assembly 28 is maintained under vacuum while the liquid finishing material cures. After the finishing material has cured and the fabric 16 is bonded to the sound board material 10 the mold assembly 28 may be opened and the finished sound board assembly S removed therefrom.

In accordance with the aforedescribed methods a precut sound board, that is a sound board which is cut to final shape, is used to fabricate a finished sound board assembly. However, it should be understood that the aforedescribed methods may also be used to fabricate a rectangular sheet of reinforced finished sound board material from which a sound board may be cut.

I claim:

1. A method for making a sound board assembly for a stringed musical instrument comprising the steps of positioning a layer of finely woven fiber glass fabric in adhering face-to-face relation with a sheet of wood with threads of the fabric extending in generally parallel relation to the grain of the wood, temporarily adhering said sheet of wood to a first mold plate with said fabric facing away from said plate, disposing a second mold plate so that a narrow space is left between said second mold plate and said layer of fabric to form a mold cavity between said first mold plate and said second mold plate, disposing said mold plates so that major surfaces of said plates are vertically oriented, introducing a transparent, curable liquid resin into the lower part of the space between said fabric and said second mold plate, evacuating air from between said mold plates at the upper part thereof while the curable liquid resin is being introduced fill said cavity, curing said resin to bond said fabric to said wood, and removing said sound board assembly from the mold plates.

2. A method for making a sound board as set forth in claim 1 wherein the step of evacuating air is performed while introducing the curable liquid resin and while curing the resin.

3. A method for making a sound board assembly for a stringed musical instrument as set forth in claim 1 wherein the step of positioning the layer of fabric is further characterized as adhering portions of the layer of fabric to associated portions of the sheet of wood.

4. A method for making a sound board assembly for a stringed musical instrument as set forth in claim 1 or claim 3 including the additional step of shaping a sound board from the sheet of wood before positioning a layer of woven fabric in face-to-face engagement with the sheet of wood.

5. A method for making a sound board assembly for a stringed musical instrument as set forth in claim 4 and including the additional step of cutting the fabric to the configuration of the shaped sound board and wherein the step of positioning the fabric is further characterized as positioning the cut fabric in overlying relation with the shaped sound board and in registry therewith.

* * * * *